Dec. 31, 1957 J. R. MEAGHER ET AL 2,818,526

SYSTEM FOR GENERATING A BAR PATTERN ON A CATHODE RAY TUBE

Filed April 28, 1954

INVENTORS
JOHN R. MEAGHER
& JOHN F. STERNER
BY Morris A. Lapkin
ATTORNEY

United States Patent Office 2,818,526

Patented Dec. 31, 1957

2,818,526

SYSTEM FOR GENERATING A BAR PATTERN ON A CATHODE RAY TUBE

John R. Meagher, Gloucester City, and John F. Sterner, Wenonah, N. J., assignors to Radio Corporation of America, a corporation of Delaware Application April 28, 1954, Serial No. 426,162

2 Claims. (Cl. 315—22)

This invention relates, generally, to systems for generating a bar pattern on the screen of a cathode ray tube. More particularly, the invention relates to a system for generating either horizontal or vertical bars on the screen of a cathode ray tube of a television receiver. While neither specifically nor exclusively limited thereto, the system of generating bar patterns, of the present invention, is particularly applicable to checking and adjusting the horizontal and vertical linearity of the received picture of a television receiver.

It has been proposed, heretofore, to check the linearity of a picture on a television receiver by means of apparatus comprising a local oscillator of fixed frequency. This fixed frequency is reduced by means of frequency divider circuits to a frequency equal to either the horizontal or vertical sweep frequency of the receiver to be tested and applied to the input of the horizontal or vertical sweep frequency oscillator of the receiver. The undivided frequency of the local oscillator is then applied to the video amplifier of the television set, thereby producing a bar pattern on the face of the cathode ray tube of the television set. The system of producing bar patterns, according to the prior art, necessitates the use of a local oscillator and frequency divided circuits of substantial accuracy. Such oscillator and frequency divider circuits are relatively more expensive in comparison to the apparatus required by the system of the present invention.

Accordingly, it is the principal object of the present invention to provide an improved system for generating a bar pattern on a cathode ray tube.

It is another object of the present invention to provide an improved system for testing electronic equipment having a cathode ray tube for horizontal and vertical linearity of the information displayed on the face of the cathode ray tube.

A further object of the present invention is to provide an improved system for generating a bar pattern on a cathode ray tube that is simple in construction, easy and economical to manufacture and operate and yet highly efficient in use.

In general, the foregoing and other objects and advantages of the present invention are accomplished by a system employing an oscillator adapted to oscillate at a frequency which is a multiple of the frequency of a cathode ray beam deflection circuit to which it is coupled. To get a vertical bar pattern, for example, on the face of the cathode ray tube, the input to the oscillator is coupled capacitively to one of the leads of the horizontal beam deflection circuit. The oscillator is adjusted to be free-running at a frequency which is about ten times the frequency of the horizontal beam deflection frequency. The output of the oscillator is then coupled to the signal input means of the cathode ray tube, that is, either to the input of the video amplifier or to the grid of the cathode ray tube. Thus, each horizontal sweep is modulated ten times, thereby resulting in ten dark and ten light vertical bars alternately spaced on the face of the cathode ray tube. In another embodiment of the present invention the input of a free-running oscillator is capacitively coupled to a beam deflection circuit through waveform shaping means. The waveform shaping means comprises means to cut off the oscillator periodically at the frequency of the beam deflection means to which it is coupled. The output of the oscillator is coupled to the video signal input means whereby to modulate the grid of the cathode ray tube periodically during each sweep in the formation of a raster on the face of the cathode ray tube.

The novel features of the invention, as well as the invention itself, both as to its organization and method of operation, will be understood in detail from the following description when considered in connection with the accompanying drawing in which similar elements have similar reference characters, and in which.

Figures 1, 2:
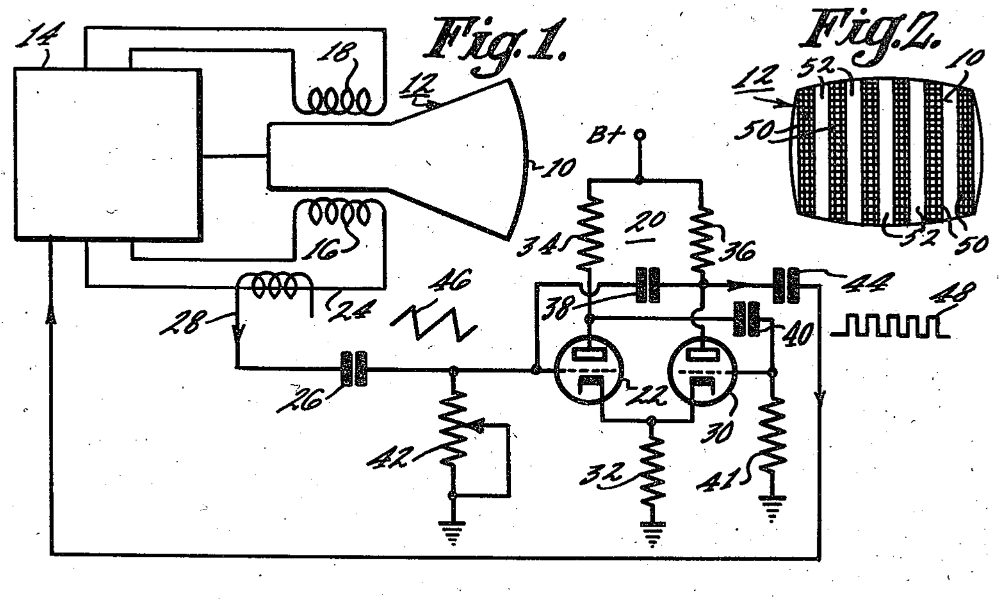
Fig. 1 is a schematic drawing, partly in block diagram form, of a system for generating a bar pattern on the face of a cathode ray tube in accordance with the present invention.
Fig. 2 is an example of a vertical bar pattern on the face of a cathode ray tube, in accordance with the present invention.

Referring now to Fig. 1, there is shown a system for generating a bar pattern on the screen 10 of a cathode ray tube 12, for the purpose of checking the linearity of a television receiver 14, shown partly in block diagram form. The television receiver 14 is of conventional type and comprises a horizontal deflection coil 16 and a vertical deflection coil 18. The horizontal deflection coil 16 and the vertical deflection coil 18 are connected to horizontal and vertical sweep circuits (not shown) in the usual manner well known in the television art.

In order to produce a vertical bar pattern on the face 10 of the cathode ray tube 12, a free-running oscillator 20, such as a balanced, free-running multivibrator, of conventional design, is capacitively coupled to one of the leads between the horizontal deflection coil 16 and the horizontal sweep oscillator (not shown) of the television receiver 14. To this end, the grid of an electron tube 22 of the multivibrator 20 is capacitively coupled to a lead 24, from the horizontal deflection coil 16, through a capacitor 26 and through the capacitance between a lead 28 loosely wrapped around the lead 24 and insulated therefrom.

The free-running, balanced multivibrator 20 also comprises an electron tube 30 having a cathode connected to the cathode of the tube 22, and to ground through a common cathode resistor 32. The anodes of the tubes 22 and 30 are connected to a source of operating B+ voltage through resistors 34 and 36, respectively. The grids and anodes of the tubes 22 and 30 are capacitively cross-coupled to form a typical, basic multivibrator circuit. To this end, the grid of the tube 22 is connected to the anode of the tube 30 through a capacitor 38; and the grid of the tube 30 is capacitively coupled to the anode of the tube 22 through a capacitor 40. The grid of the tube 30 is connected to ground through a resistor 41. The frequency of the multivibrator 20 may be adjusted by means of a variable resistor 42 connected between the grid of the tube 22 and ground.

The frequency of the balanced, free-running multivibrator 20 may be adjusted to oscillate at a multiple of the frequency of the sweep circuit (not shown) to which the input of the multivibrator 20 is coupled. For instance, if the horizontal sweep circuit (not shown) of the television receiver 14 is oscillating at a frequency of 15,750 C. P. S., the frequency of the multivibrator 20 may be made to oscillate at a frequency of about six times the frequency of the horizontal sweep circuit, that is, about 94 kc., by adjusting the resistance of the variable resistor 42. The output of the multivibrator 20 is substantially a series of periodic square waves. The output of the multivibrator 20 is taken from the anode of the tube 30, and coupled to the video amplifier (not shown) or to other signal input means such as the grid (not shown) of the cathode ray tube 12 through a capacitor 44.

The operation of the system for generating a bar pattern on the screen 10 of the cathode ray tube 12 of the television receiver 14 will now be described. Let it be assumed that a vertical bar pattern comprising a series of alternately disposed relatively dark and light vertical bars is desired in order to test the linearity of the received picture. The television receiver 14 is turned on and may be tuned to receive transmission signals from a television station, or may be adjusted to provide a blank raster. The balanced, free-running oscillator 20 has its input coupled to one of the leads 24 between the horizontal deflection coil 16 and the horizontal deflection sweep circuit (not shown) as by wrapping the insulated lead 28 around the insulated lead 24. Thus, the input to the grid of the tube 22 of the multivibrator 20 is a sawtooth voltage having the waveform represented by the sawtooth waveform 46. The resistor 42 is adjusted to give the multivibrator 20 a time constant whereby it will oscillate at a multiple of the frequency of the sawtooth wave 46.

The operation of the balanced, free-running multivibrator 20 is well known. It will be noted that the tubes 22 and 30 of the multivibrator 20 are essentially resistance-capacitance coupled amplifiers wherein an input signal to the grid of the tube 22 is reversed in phase at the anode of the tube 22. Since the output of the tube 22 is fed to the input grid of the tube 30, and the output at the anode of the tube 30 is fed back to the grid of the tube 22, it will be noted that the output from the tube 30 is of proper polarity to reinforce the signal applied to the grid of the tube 22, and, therefore, oscillations take place. Since the operation of the free-running multivibrator 20 is well known, it will not be described in greater detail. A more detailed explanation may be had, however, by referring to a description of this type of multivibrator in the publication "Radar Electronic Fundamentals," pages 202–206, Bureau of Ships, Navy Department, June 1944, published by the U. S. Government Printing Office in Washington, D. C.

The output of the multivibrator 20 is a series of square waves as illustrated by the waveform 48. If the multivibrator 20 has been adjusted to oscillate at a frequency which is six times that of the horizontal sweep circuit of the television set 14, there will be six square waves produced at the output of the multivibrator 20 for every sawtooth wave input to the grid of the tube 22 of the multivibrator 20. The output of the multivibrator 20 is coupled to the signal input means (not shown) of the television receiver 14. As is well known, the signal input means may comprise the video amplifier (not shown), or the grid or the cathode of the cathode ray tube 12, depending upon the particular circuitry of the television receiver 14. It will be understood that for every horizontal sweep of the electron beam (not shown) of the cathode ray tube 12 across the face 10 thereof, the electron beam will be modulated by a square wave output of the multivibrator 20. In this example, the cathode ray beam will be turned off and on six times during each horizontal sweep, thereby producing alternately six dark and six light substantially equally spaced lines across the face 10 of the cathode ray tube 12. Since this will happen during every horizontal sweep, the horizontal light and dark lines will orient themselves underneath each other to form vertical dark and light bars on the screen 10 of the cathode ray tube 12.

Referring now to Fig. 2 there is shown an alternate series of black bars 50 (shown cross-hatched to indicate the color black), and white bars 52 which will be produced in the example just considered. It will be noted that the positive-going waves of the waveform 48 are responsible for producing the relatively light bars 52 of the bar pattern, and that the negative-going waves of the waveform 48 are responsible for the relatively dark bars 52.

Figure 3:
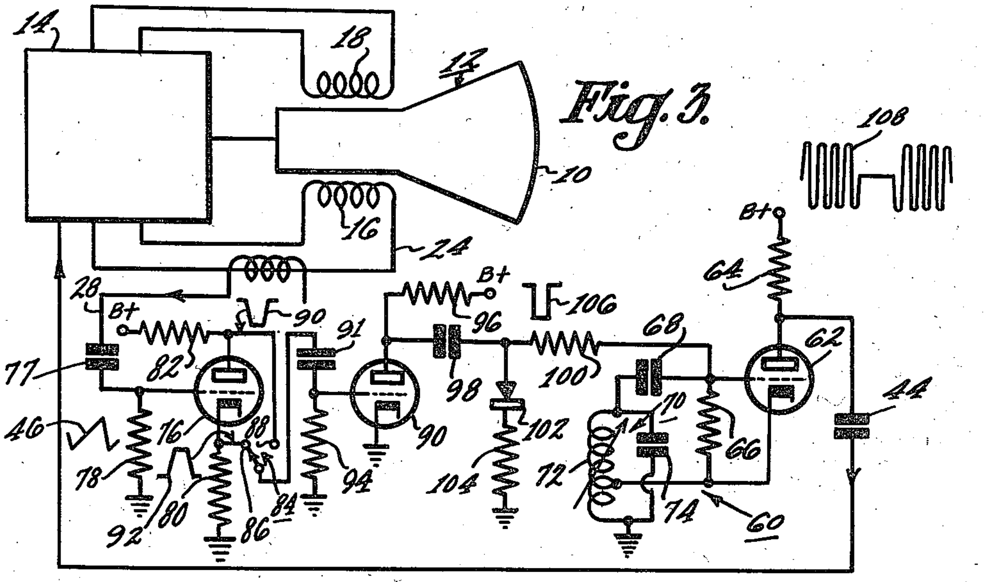
Fig. 3 is another embodiment of a system for generating a bar pattern on the face of a cathode ray tube, in accordance with the present invention.

Referring now to Fig. 3 there is shown another embodiment of the present invention for producing a bar pattern on the screen 10 of a cathode ray tube 12 of a television receiver 14. A free-running oscillator 60 has its input coupled to one of the deflection circuits (not shown) as by wrapping the insulated lead 28 around the insulated lead 24, through voltage shaping means, for the purpose hereinafter appearing. The output of the oscillator 60 is coupled to the video signal input means of the television receiver 14 through the capacitor 44 in the same manner as explained for the system in Fig. 1.

The oscillator 60 is a free-running oscillator of the Hartley type. It comprises an electron tube 62 having an anode connected to a source operating B+ potential through a resistor 64. The grid of the tube 62 is connected to the cathode thereof through a resistor 66. The grid of the tube 62 is also connected to ground through a capacitor 68 and a tunable tank circuit 70 connected in series therewith. The cathode of the tube 62 is connected to a tap on a variable inductor 72 of the tank circuit 70. A capacitor 74 is connected in parallel with the inductor 72. The values of the components of the oscillator 60 are such that the oscillator 60 will oscillate when no external signal is applied to the grid of the tube 62.

Means are provided to either cut off or damp out periodically the oscillations of the oscillator 60 at a frequency of the beam deflection sweep circuit (not shown), of the television receiver 14, to which it is coupled, for the purpose hereinafter appearing. To this end, the lead 28 is coupled to the grid of a shaper amplifier tube 76 through a capacitor 77. The grid of the amplifier 76 is connected to ground through a resistor 78, and the cathode of the amplifier 76 is connected to ground through a resistor 80. The anode of the amplifier 76 is connected to a source of B+ operating potential through a resistor 82.

Means are provided to reverse the polarity of the input signals to the grid of the oscillator 60. To this end, there is provided a single pole double-throw switch 84 having one contact 86 connected to the cathode of the amplifier 76, and another contact 88 connected to the anode of the amplifier 76. The armature of the switch 84 is connected to the grid of a shaper amplifier tube 90 through a capacitor 91. Thus, it will be understood that if the input signal to the grid of the amplifier 76 is positive, a negative-going signal can be applied to the grid of the amplifier 90 by taking the signal from the anode of the amplifier 76, or, a positive-going signal can be applied to the grid of the amplifier 90 by taking the signal from the cathode of the amplifier 76. The switch 84 provides a means for selecting the proper polarity.

The circuitry connected to shaper amplifier 76 has circuit constants such that an input sawtooth waveform 46 will provide at its anode an inverted clipped voltage waveform 90a, and at its cathode a positive clipped voltage waveform 92. Depending upon the position of the switch 84, one of the latter waveforms is applied to the grid of the shaper amplifier 90.

The grid of the amplifier 90 is connected to ground through a resistor 94. The cathode of the amplifier 94 is also grounded, and the anode is connected to a source of B+ operating potential, through a resistor 96. The output of the amplifier 90, which is adapted to be a sharp square wave pulse, is connected to the grid of the oscillator tube 62 through a capacitor 98 and a resistor 100 connected in series therewith. The junction between the capacitor 98 and the resistor 100 is connected to ground through a rectifier 102 and a resistor 104. The rectifier 102 is connected in manner to allow conventional current to flow from the capacitor 98 to ground.

The operation of the embodiment of Fig. 3 of the system for generating a bar pattern, in accordance with the present invention, will now be described. If it is desired to place upon the face 10 of the cathode ray tube 12 of the television receiver 14 a bar pattern of alternate dark and light vertical bars, the oscillator 60 is adjusted to oscillate at a frequency of, for example, twenty times the frequency of the horizontal beam deflection circuit. This adjustment may be accomplished by varying the inductance of the variable inductor 72. If the frequency of the horizontal beam deflection circuit is 15,750 C. P. S., the frequency of the oscillator 60 is adjusted to be about 315 kcs. The constants of the components of the oscillator 60 are such that a negative signal input to the grid of the tube 62 will momentarily stop the oscillations of the oscillator 60 for a duration of about two cycles. Also, a strong positive signal will cause the oscillator 60 to cease oscillating momentarily by damping out the oscillator 60.

With the system for generating a bar pattern connected as in Fig. 3, and with the switch 84 in the position indicated, a positive-going sawtooth voltage wave 46 is amplified and shaped so that it will have the clipped form of the voltage waveform 92 at the cathode of the tube 76. The waveform 92 is further amplified and shaped, by the amplifier tube 90, into a negative-going square wave of the form shown by the waveform 106. Since the rectifier 102 presents an open circuit to a negative-going potential, the square wave 106 will be applied to the grid of the oscillator 62 and will momentarily cut off the oscillations of the oscillator circuit 60. The output from the oscillator tube 62, at the anode thereof, will have the wave-shape shown by the voltage waveform 108. Thus, it will be understood that the oscillations of the free-running oscillator 60 are periodically and momentarily stopped at a frequency determined by the beam deflection circuit to which it is coupled.

The interruption of the free-running oscillations of the oscillator 60 is for a brief period, that is, for about one or two oscillations of the oscillator 60. Since the output of the oscillator 60 is coupled to the video signal input means, such as the video amplifier, the grid or the cathode of the cathode ray tube 12, it will be understood that the electron beam of the cathode ray tube 12 will be turned on and off by the oscillations of the oscillator 60 during each horizontal sweep of the face 10 of the cathode ray tube 12. Dark vertical bars will be caused by the negative-going oscillations of the waveform 108, and light vertical bars will be caused by the positive-going oscillations of the waveform 108. Since the cessation of the oscillations of the oscillator 60 coincide with the peak voltage of the beam deflection circuit to which it is coupled, the interruption of oscillations of the oscillator 60 will coincide with the blanking, or return period, of the electron beam of the cathode ray tube 12.

Figure 4:
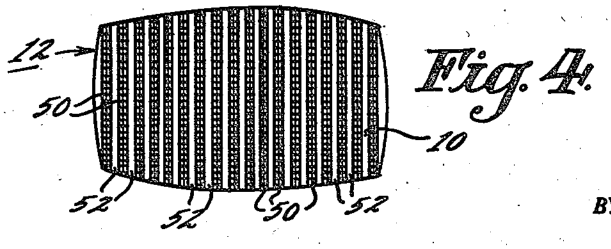
Fig. 4 is an example of a vertical bar pattern on the face of a cathode ray tube by the system of Fig. 3, in accordance with the present invention.

Referring now to Fig. 4 there is shown a series of black and white vertical bars alternately disposed with respect to each other, and forming a bar pattern on the face 10 of the cathode ray tube 12, in accordance with the present invention, as illustrated in the example above given. The black bars 50 are shown cross-hatched to indicate the color black.

While the examples of the system for generating a bar pattern, in accordance with the present invention, have been given with respect to the generation of vertical bars, it will be understood that if the input lead 28 were capacitively coupled to the leads from the vertical deflection coil 18 in both Figs. 1 and 3, a horizontal bar pattern would be derived. To obtain a horizontal bar pattern a readjustment of the frequency of the multivibrator 20, in Fig. 1, or the oscillator 60 in Fig. 3, to a frequency which is a multiple of a frequency of a vertical deflection circuit (not shown) would be necessary.

Thus, there has been shown and described a novel system for generating a bar pattern on the screen of a cathode ray tube of a television receiver. It will be understood that a bar pattern may be produced on the face of any cathode ray tube having two or more sweep deflection circuits connected therewith. In a preferred embodiment of the invention a free-running oscillator, such as a square wave output, balanced, free-running multivibrator has its input capacitively coupled to one of the leads of the deflection yoke, or coil, associated with a beam deflection circuit. The output of the oscillator, which is adjusted to have a frequency that is a multiple of the beam deflection circuit to which it is coupled, is capacitively coupled to the video signal input means of the cathode ray tube to modulate the beam periodically. It will be noted that the input to the oscillator will synchronize the output thereof so that the output will be an exact multiple of the input frequency. This is especially true when the input to the oscillator is other than a pure sine wave. In another embodiment shown and described, a free-running oscillator is keyed off periodically by either a positive-going or negative-going voltage at a frequency determined by the sweep frequency of the beam deflection circuit to which it is coupled. The periodic blanking of the oscillations of the free-running oscillator is such that it coincides with the return sweep of the electron beam.

What is claimed is:

1. Apparatus for generating a bar pattern on the screen of a cathode ray tube, said tube having signal input means and a plurality of pulsed beam deflection means connected in circuit therewith, said apparatus comprising an oscillator having input and output means, means to couple one of said pulsed beam deflection means to said input means of said oscillator to synchronize said oscillator therewith, said oscillator being adjustable to oscillate at a frequency that is a multiple of the frequency of said one of said pulsed beam deflection means when coupled thereto, means to couple said output means of said oscillator to said signal input means of said tube, and said first-mentioned coupling means comprising means to blank said oscillator periodically at the frequency of one of said pulsed beam deflection means.

2. Apparatus for generating a bar pattern on the screen of a cathode ray tube, said tube having signal input means and a plurality of pulsed beam deflection means connected in circuit therewith, said apparatus comprising an oscillator having input and output means, means to couple one of said pulsed beam deflection means to said input means of said oscillator to synchronize said oscillator therewith, said oscillator being adjustable to oscillate at a frequency that is a multiple of the frequency of said one of said pulsed beam deflection means when coupled thereto, means to couple said output means of said oscillator to said signal input means of said tube, said first-mentioned coupling means comprising means to shape the pulses of said pulsed beam deflection means, and means to blank said oscillator periodically by said shaped pulses.

References Cited in the file of this patent

UNITED STATES PATENTS

| | | |
|---|---|---|
| 2,423,304 | Fitch | July 1, 1947 |
| 2,479,081 | Poch | Aug. 16, 1949 |
| 2,576,859 | Schroeder | Nov. 27, 1951 |
| 2,668,188 | Naslund | Feb. 2, 1954 |
| 2,693,530 | Macdonald | Nov. 2, 1954 |
| 2,741,722 | Shields | Apr. 10, 1956 |

OTHER REFERENCES

"Radio and Television News," May 1952, "An inexpensive TV cross-bar generator," Garner, Jr., pp. 40, 41, 102, 104.